United States Patent [19]

Nelson

[11] Patent Number: 5,233,456
[45] Date of Patent: Aug. 3, 1993

[54] RESONANT MIRROR AND METHOD OF MANUFACTURE

[75] Inventor: William E. Nelson, Dallas, Tex.

[73] Assignee: Texas Instruments Incorporated, Dallas, Tex.

[21] Appl. No.: 811,407

[22] Filed: Dec. 20, 1991

[51] Int. Cl.⁵ .............................................. G02B 26/08
[52] U.S. Cl. .................... 359/214; 359/224; 359/846; 359/221
[58] Field of Search ............... 359/212, 213, 214, 221, 359/223, 224, 225, 847, 848, 850, 851, 872, 846

[56] References Cited

U.S. PATENT DOCUMENTS

| | | | |
|---|---|---|---|
| 3,799,644 | 3/1974 | Street | 359/221 |
| 4,302,709 | 11/1981 | Tichtinsky | 359/214 |
| 4,317,611 | 3/1982 | Petersen | 359/214 |
| 4,368,489 | 1/1983 | Stemme et al. | 359/214 |
| 4,421,381 | 12/1983 | Ueda et al. | 359/214 |
| 4,662,746 | 5/1987 | Hornbeck | 359/223 |
| 5,018,256 | 5/1991 | Hornbeck | 359/846 |
| 5,083,857 | 1/1992 | Hornbeck | 359/224 |

*Primary Examiner*—Loha Ben
*Attorney, Agent, or Firm*—Brian C. McCormack; Richard Donaldson; James Kesterson

[57] ABSTRACT

A resonant mirror is disclosed which comprises a deflectable mirror generally planar with the stop surface of a substrate. The mirror is suspended adjacent the top surface by at least two supporting elements. At least one supporting element is displaced from an edge of the mirror. The supporting elements, being collinear, define an axis of rotation about which the mirror may oscillate to steer incident light through an angle.

20 Claims, 3 Drawing Sheets

RESONANT MIRROR AND METHOD OF MANUFACTURE

TECHNICAL FIELD OF THE INVENTION

This invention relates in general to electro-optical devices, and more particularly, to a resonant mirror and method of manufacture.

BACKGROUND OF THE INVENTION

Visible light may be accurately positioned or "steered" by at least three classes of electro-optical devices; galvanometric scanners, resonant mirrors, and rotating polygon mirrors.

Galvanometric scanners reflect light off of a mirror which may be rotated about an axis through a small angle by application of an electrical current situated in the presence of a fixed magnetic field. The electrical current generates a magnetic field proportional to the current and the interaction of the two magnetic fields causes the electrical lead conducting the electrical current to twist relative to the fixed magnetic field. This twisting motion can be advantageously linked to a small mirror by which incident light may be steered.

Resonant mirrors similarly reflect light off of a mirror which is caused to move by the application of an electrical signal. Here, however, the electrical signal drives a subcomponent such as a voice coil from an audio speaker. The voice coil in turn pushes against a spring-mounted hinged mirror. The mirror typically has attached to it a counterweight such that the resonant frequency of the counterweight and mirror assembly acts like a tuning fork. The mirror can then be made to oscillate at a resonant frequency to steer incident light in a periodic fashion. These two classes of devices are typically used in applications such as flying spot scanners and laser printers.

The rotating polygon mirror is a multi-faceted mirror rotated at high speed by a precision motor. As each facet subtends a light beam from a laser source, it scans it through an arc with a typical included angle up to about 120 degrees. The mirror elements are generally facets cut onto the periphery of a disk, though other shapes are sometimes encountered. The laser polygon is most often used in laser xerographic printer systems as the optical scanner, converting digital inputs into patterns of light on a photoreceptor surface. The patterns are subsequently developed and printed onto paper.

Galvanometric scanners, resonant mirrors, and polygon mirrors have disadvantages when used to steer light. All three classes of devices are relatively large, are expensive, and are susceptible to shock and vibration. These limitations preclude their use in many consumer applications and where component size is a constraint. Galvanometric scanners and resonant scanners are generally slow responding and are also typically susceptible to changes in the scanner's motion. This precludes their use in most mobile environments.

Another electro-optical device known to those skilled in the art is a spatial light modulator such as a deformable mirror device ("DMD"). While DMD's have been used in some light steering applications they suffer from the disadvantage of being too small for many applications. A typical DMD mirror is on the order of $12 \times 12$ $\mu m^2$. A useful light steering device should be in the range of $0.5 \times 0.1$ $in^2$. In attempting to increase the size of DMD's a significant problem arises as a result of the mirror distortion. Typically, DMD's are supported at two edges. Due to the increased size of such a large DMD, they will distort under the influence of the applied operating voltage, making them useless.

Therefore, a need has arisen for a method and apparatus for steering light which is very compact, inexpensive, power efficient, and suitable for use in a non-stationary environment.

SUMMARY OF THE INVENTION

In accordance with the present invention, a method and apparatus is provided which substantially eliminate and reduce the disadvantages and problems associated with prior resonant mirrors, galvanometric scanners, laser polygon scanners and DMDs.

A resonant mirror is disclosed which comprises a deflectable mirror generally planar with the top surface of a substrate. The mirror is suspended adjacent the top surface by at least two supporting elements. At least one supporting element is displaced from an edge of the mirror. The supporting elements, being collinear, define an axis of rotation about which the mirror may oscillate to steer incident light through an angle.

A first technical advantage of the disclosed invention is its size. In one embodiment of the invention, a full featured modulator for use in an apparatus for light steering is disclosed that is the size of a typical integrated circuit package.

A second technical advantage of the invention is its power consumption. The disclosed device is electrostatic in nature, and thus consumes negligible power. The invention therefore additionally benefits from lower heat generation and better safety characteristics.

A third advantage is speed of response. Because the mirror is fabricated using a thin-film semiconductor process, the total mass is much lower than mirrors fabricated on conventional substrates.

Another technical advantage of the disclosed invention is its portability. When properly packaged, the resonant mirror may be used in a mobile environment with little or no degradation of performance or threat of premature system failure.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

The preferred embodiment of the present invention is illustrated in FIGS. 1 through 9 of the drawings, like numerals being used to refer to like and corresponding parts of the various drawings.

Figure 1:
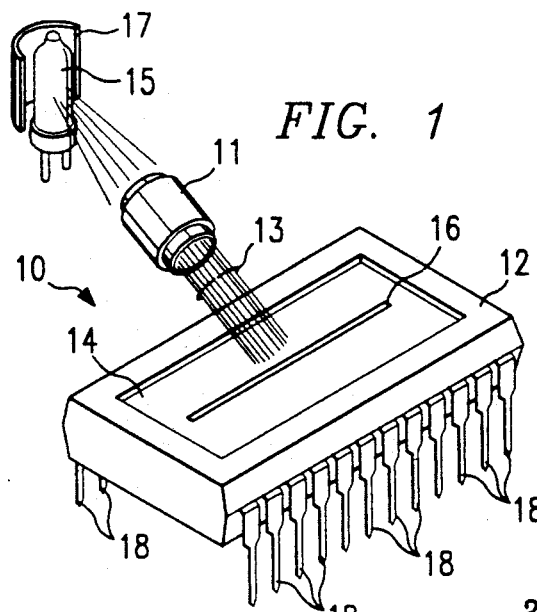
FIG. 1 depicts perspectively a first embodiment of the disclosed invention.

FIG. 1 depicts perspectively beam steering device 10 containing one embodiment of the disclosed invention. Device 10 comprises a body 12, typically plastic, encasing a substrate 14 and a long thin deflectable mirror element 16. Substrate 14 typically contains a shallow well (shown in FIG. 2) having a base and sidewalls from which mirror 16 is supported by flexible hinges (shown in FIG. 2). The well allows mirror element 16 to rotate out of the plane containing the substrate and about the axis formed by the hinges all the while maintaining the flatness of mirror element 16. Schematically, a condenser system directs a beam of light 13 from light source 15 and a reflector 17 onto DMD 16 through lens 11.

In a practical application, light bundle 13 may be from any source of light, such as a laser, and may also contain image information. For example, lens 11 may be relaying light from another spatial light modulator (SLM) on to the DMD scanning mirror. The scanned light may subsequently converge to a focus at an image plane beyond device 10, with or without passing through an intermediate lens element.

Because the mirror element 16 operates substantially in the plane of substrate 14, it does not introduce a defocusing effect or any field curvature into the final image as is the case with the conventional scanners.

Device 10 also has connected to it a varying number of electrical leads 18 which connect it to other subcomponents. The number of leads 18 may vary depending on the level of sophistication of circuitry contained in device 10. For instance, substrate 14 might itself be a semiconductor and comprise an internal signal generator that controls the rate of rotation of mirror element 16. In such a case, device 10 might only need three leads, ground, power, and on/off. Device 10 however, may also be designed to be driven by an external signal generator (shown in FIG. 3). In such a case, additional pins may be needed to control the motion of mirror element 16 and the substrate need not be a semiconductor.

In operation, an incident bundle of light rays 13 are directed to the top face of device 10 where it reflects off of mirror element 16. Mirror element 16 is then made to twist or rotate about an axis defined by its supports such that the reflected light is steered through twice the angle of rotation of the mirror element. Mirror element 16 will have associated with it a natural frequency of rotation, its "resonant frequency", at which it will rotate with a minimum driving force. By advantageously controlling the physical dimensions and the materials of mirror element 16, the resonant frequency of mirror element 16 may be tailored for particular applications. The resonant frequency of mirror element 16 is given by the expression:

$$f = \frac{1}{2\pi} \sqrt{\frac{\tau/I}{\theta}}$$

or $$f = \frac{1}{2\pi} \sqrt{K/I}$$

where I is the moment of inertia of the mirror element, $\tau$ is the peak vibrational torque reaction of the mirror at a peak amplitude $\theta$, and K is the spring constant, $\tau/\theta$, a measure of the rotational stiffness of the hinge elements 16. The mechanical properties of simple geometries and most semiconductor materials are well known, and hence K and I can be determined for most situations.

The electro-mechanical properties of mirror element 16 may be incorporated into a wide variety of systems. For instance, device 10 may be used to repetitively steer a modulated laser beam onto a drum of a xerographic printer or universal product code ("UPC") scanner. In the first application, a laser beam is scanned onto a drum which is made to attract toner where it has been struck by the laser beam. The drum can then transfer the developed toner pattern onto plain paper to produce a printed image. In the latter application, a laser beam is scanned onto a product to be purchased by a consumer. The beam is reflected off of a series of spaced lines on the product and back to a photodiode detector. The scanner can then determine the identity of the product to be purchased by the pattern of lines and the consumer may be accordingly charged. The laser beam must be diverted to repetitively scan a volume of space so that the product identity may be determined regardless of the orientation to the laser beam.

In other applications, device 10 may be used as part of a virtual display system. In such a system, a series of rows of display pixels from a spatial light modulator array are sequentially projected onto the resonant mirror while the mirror is made to oscillate. The series of rows may be produced by, for instance, a conventional deformable mirror device reflecting a white light source. By advantageously timing the output of the deformable mirror device and the position of the resonating mirror, an entire full page display may be made. The persistence of the viewer's eye will cause the viewer to perceive the series of adjacent lines as a full page display. Such a system is described in U.S. patent application Ser. No. 739,078, "Virtual Display Device and Method of Use" to Nelson, now U.S. Pat. No. 5,168,406. Finally, by scanning either a spot, or an array of suitably modulated light pulses, the exposure of a light sensitive media, such as photographic film, photoresist or any other photopolymer can be accomplished.

Figure 2:
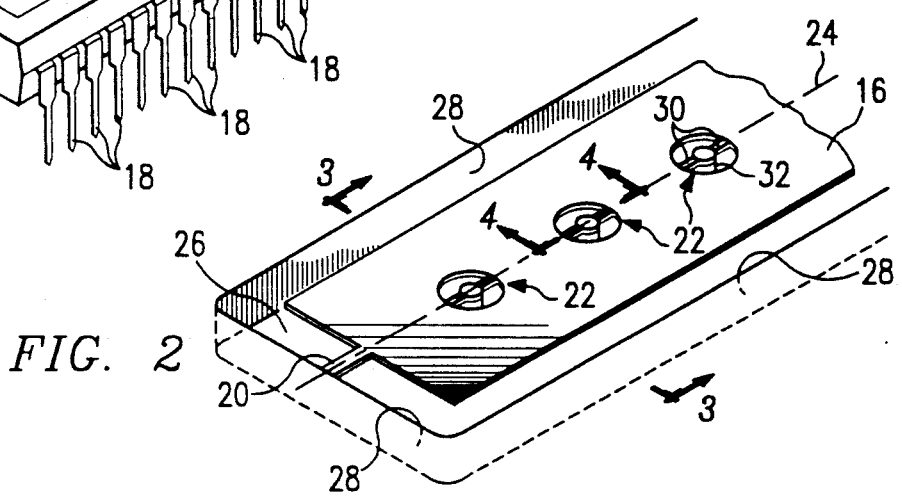
FIG. 2 illustrates perspectively the mirror element depicted in FIG. 1.

FIG. 2 depicts perspectively the left half of the mirror element 16 of FIG. 1. It should be understood that although only the left portion of mirror element 16 is depicted, a symmetrical right portion is intended. Mirror element 16 is supported along its length by a series of axially aligned supports. For stability reasons, at least two supports must be used. These may be either located at the end of mirror 16 as is hinge element 20 or may be displaced from an edge of mirror element 16 as are supporting members 22. All of the supports are aligned along the line 24 forming the "axis of rotation." These intermediate supporting members 22 stiffen mirror element 16 in the long dimension without impeding the rotation of mirror element 16 about its axis of rotation. As a result, mirror element 16 is generally planar with the top of well 26 or to the underlying substrate. Each supporting member is anchored to the base of the well and insures the flatness of mirror element 16 during operation. It should be understood that well 26 may, in fact, be etched from substrate 14 or may simply remain after fabrication of a layer or layers which form sidewalls 28. Sidewalls 28 are generally continuous around the perimeter of mirror element 16.

Without supporting member 22, mirror element 16 would sag into well 26 due to its relative great length and thin cross section. In operation, mirror element 16 would not rotate about its axis of rotation 24 when driven (as will be discussed below) but might simply sag downward further if it is fabricated without supporting member 22. Both of these results would interfere with the desired light steering capabilities of the device. Supporting member 22 itself comprises at least one hinge element 30 which connect mirror element 16 to a central post 32. In the preferred embodiment, supporting member 22 comprises two symmetrical hinge elements 30. These hinge members typically are made of the same material as hinge element 20 and mirror element 16, but of a different thickness.

Figure 3:
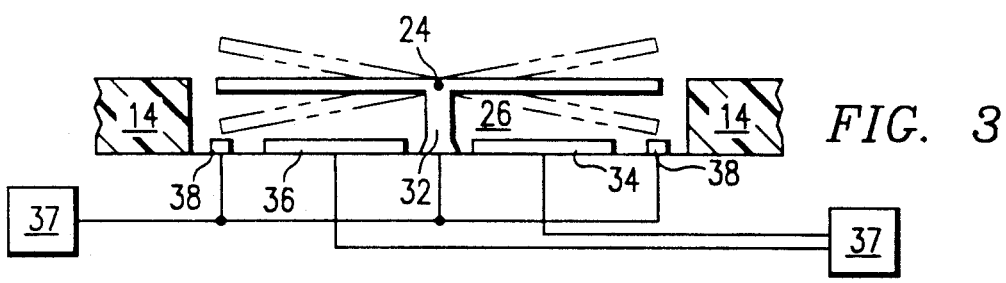
FIGS. 3 and 4 illustrate, in cross-sectional view, the mirror element depicted in FIG. 2 along lines 3—3 and 4—4 respectively.

FIG. 3 depicts mirror element 16 taken along line 3—3 of FIG. 2. Mirror element 16 is supported by a central post 32 in well 26. Central post 32 supports mirror element 16 from the base of well 26 along the axis of rotation 24. Device 10 also contains at least one electrode 34 displaced outwardly from the axis of rotation 24. A second complementary electrode 36 may be added to device 10 in a second position also displaced outwardly from the axis of rotation 24 and in a direction generally opposite from the direction of electrode 34. As depicted, electrodes 34 and 36 are electrically connected to a signal generator 37. Because mirror element 16 and posts 32 can be electrically isolated from electrodes 34 and 36, an additional voltage can be applied to the mirror element 16 itself by signal generator 39 to accomplish other control functions well known to the DMD user, such as bias and reset. Signal generators 37 and 39 may be located within or without device 10.

Device 10 might also comprise one or two stops 38 displaced outwardly from electrodes 34 and 36 and held at the same electrical potential as mirror element 16. These stops are called landing electrodes and are positioned so that mirror element 16 will strike them before striking the electrodes 34 and 36 or any other part of device 10. This prevents an electrical current from flowing between mirror element 16 and the electrodes 34 and 36, or any other part, which would fuse the two together or cause other damage. It should be understood that the electrodes and stops may be single sets of small pads, multiple sets of small pads or long strips running generally parallel to the axis of rotation.

The periodic rotation of mirror element 16 about its axis of rotation 24 may be controlled by applying an alternating current between electrodes 34 and 36. The signals applied to electrodes 34 and 36, in the preferred embodiment, are 180° out of phase with each other and have a frequency equal to the resonant frequency of mirror element 16. Mirror element 16 is meanwhile held at an intermediate potential. The amplitude of rotation may be regulated by controlling the amplitude of the alternating waveform.

In the alternate, mirror 16 may be driven off resonance. In such a case, it is deflected in an analog fashion to about 50% of the maximum rotation angle. After that point, electrostatic attraction, which goes as the inverse square of the mirror 16 to electrode 34, 36 spacing, will overcome the linear restoring torque of hinges 30, and the mirror will land on landing electrode 38 at the full deflection angle. This is the digital mode of operation. The rate of rotation is controlled by mirror inertia, I, and damping due to the gas present in the cavity 26 with the mirror.

Figure 4:
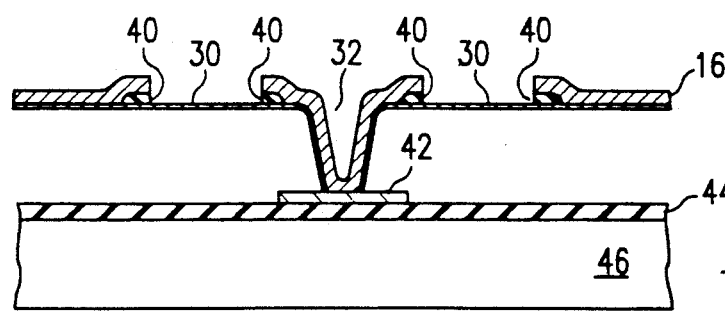

FIG. 4 depicts a cross-sectional view of mirror element 16 of FIG. 2 taken along the line 4—4. Here, mirror element 16 is connected to support post 32 by two thin hinge elements 30. Hinge elements 30 are partially covered by an oxide layer 40, a portion of which remains after manufacture as will be more fully described below. Central post 32 rests on electrically isolated pad 42 and layers 44 and 46. Substrate 46 may contain circuitry necessary to drive mirror element 16 about its axis of rotation as described above.

FIGS. 5a–5f illustrate, in cross-sectional view, sequential steps of the mirror element depicted in FIG. 4 during fabrication.

(a) Initially, substrate layer 46 is prepared using conventional photolithographic techniques. Substrate layer may contain, for instance, an internal oscillator for driving mirror element 16 (FIGS. 1–4) or other control circuitry.

Each support post pad 42 is insulated from the underlying substrate by an insulator such as silicon dioxide layer 44, typically 2000 Angstroms thick. Post pad 42 is approximately 3000 Angstroms thick and is fabricated from an alloy of aluminum, titanium, and silicon ("Ti:Si:Al"). After the Ti:Si:Al is sputter deposited onto silicon oxide layer 44, it is patterned and plasma etched to define post pad 42, electrodes 34 and 36 and stops 38 (latter three shown in FIG. 3).

(b) A photoresist is then spun on and baked in, typically, three applications to a total thickness of approximately 4 microns to form spacer 48. Three applications of, typically positive, resist are used to fill the thickness to avoid resist surface waves which can occur when spinning on a single, very thick layer. A bake of approximately 180° C. is required after each application of resist to prevent the previous layers from dissolving in subsequent resist applications, to drive out excess solvent from the spacer and to avoid the formation of solvent bubbles under the hinge metal.

(c) Spacer 48 is etched to form a via that exposes each post pad 42.

(d) Approximately 800 Angstroms of Ti:Si:Al is applied to spacer 48 to form part of each post and a thin hinge layer 50 from which the end hinges and central hinges are etched. The resistancy to twist, or flexibility of the hinges may be controlled by controlling their length, width and thickness as well as by controlling their composition. Typically, each hinge is two microns wide. The support post hinges are ten microns long. Next, 1,500 Angstroms of silicon dioxide is deposited, patterned and etched to form hinge etch stops 52 over all future hinges.

(e) Approximately 3600 Angstroms of Ti:Si:Al is sputter deposited onto hinge layer 50 and hinge etch stops 52 to form mirror layer 54. The deposition of the metal of mirror layer 54 is made under the same conditions as for the deposition of hinge layer 50 so that no stresses between the metal layers are developed. The moment of inertia, I, of each mirror element 16 (shown in FIGS. 1–4) may be controlled by controlling their length, width and thickness as well as by controlling their composition. Typically, each mirror element is one quarter inch wide and one inch long. Finally, an etch stop layer 56 is deposited on top of mirror layer 54 for protection during subsequent fabrication steps.

Figure 5A:
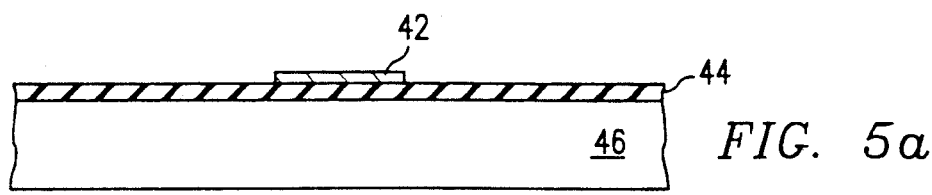
FIGS. 5a through 5f illustrate, in cross-sectional view, sequential steps of the mirror element depicted in FIG. 2 during fabrication.
Figure 5B:
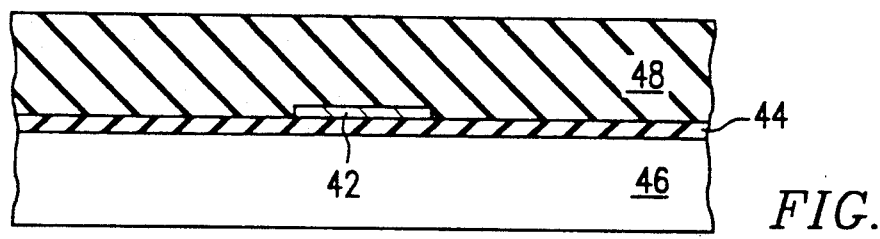
Figure 5C:
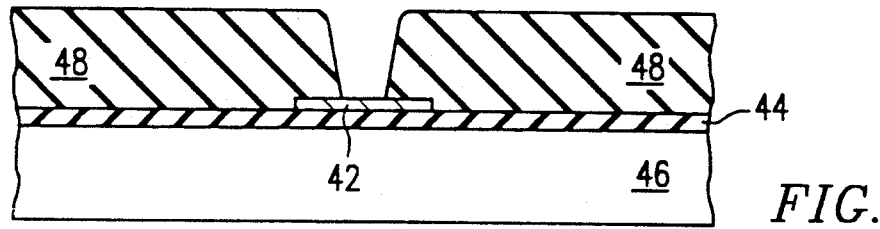
Figure 5D:
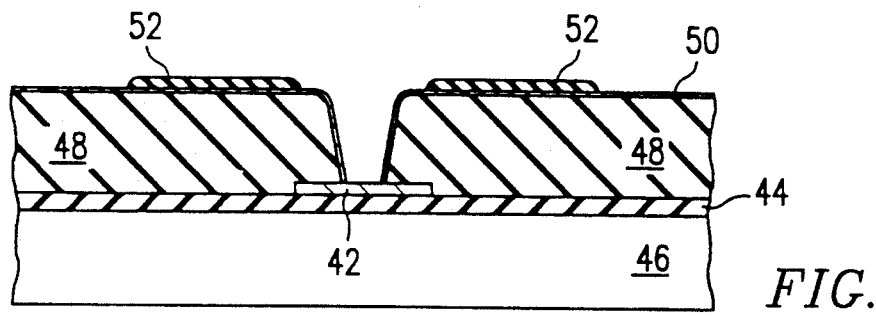
Figure 5E:
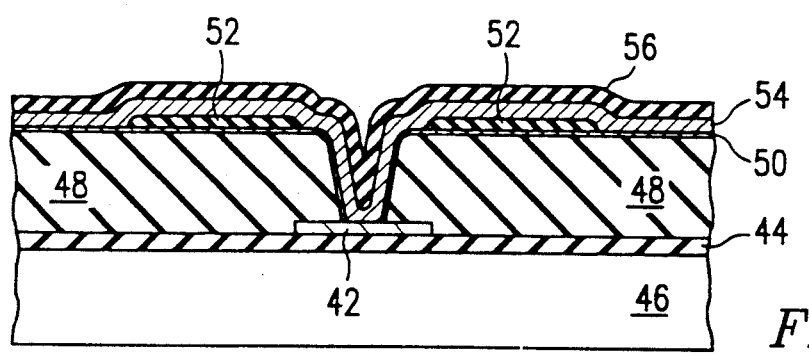
Figure 5F:
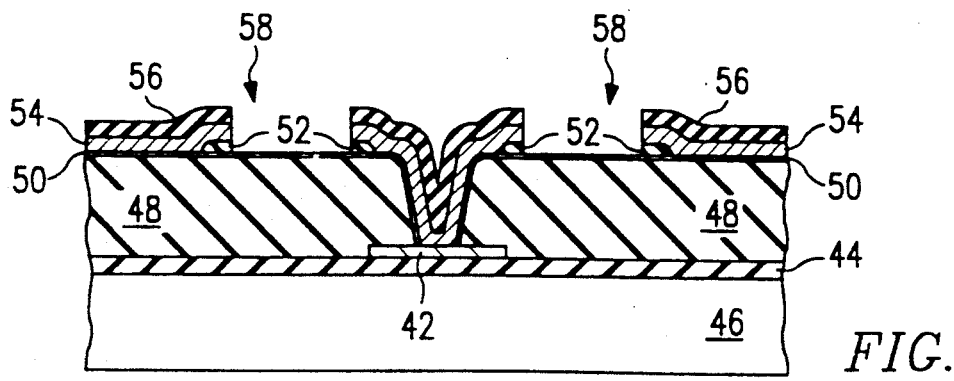

(f) A photoresist layer is applied to etch stop layer 56 and patterned to define plasma etch access holes 58 above hinge stops 52 (shown in FIG. 5e). The patterned photoresist layer may then be used as a mask for plasma etching the mirror element layer above each hinge stop. Access holes 58 appear as a set of "C's" facing one another when viewed from above. The plasma etch of the aluminum alloy may be made with a chlorine/boron trichloride/carbon trichloride etch gas mixture. After the remaining photoresist layer is removed, remaining etch stop layer 56 and the hinge etch stops 52 may be removed by an anisotropic etch.

Access holes 58 may be minimized by making them conform to the post and hinge dimensions, with a gap of only 1 or 2 microns separating the posts and hinges from mirror 16. This minimizes the optical effects of the post and hinge features on the mirror performance.

Spacer 48 is removed by, for instance, etching in oxygen with a few percent fluorine. The completed support post of the resonant mirror is depicted in FIGURE 4.

Optional end hinge 20 (depicted in FIG. 2) is fabricated using the same steps as was the central post and hinge elements depicted in FIGS. 5a-5f. Each end hinge 20 is integrated into the surrounding of non-rotating mirror metal. In some applications, it may be preferable to eliminate the surrounding structure, so that only the active mirror element protrudes above the substrate layer 46. Support posts could be provided at mirror extreme ends in that case.

A practical limitation of the embodiment described relates to the limiting spacer thickness and support post heights achievable using reasonable semiconductor processes. The size of the via formed in FIG. 5c is related by technical processes to the thickness of spacer layer 48. In general, the thicker the spacer layer the larger the subsequent via must be. The size of the via must be minimized, however, to minimize any optical aberrations in the resulting mirror element 16. This optical limitation, therefor, limits the thickness of spacer layer 48 and the maximum angle of rotation. Spacers of the prescribed 4 micron thickness will only permit rather small rotation angles for mirrors having any appreciable width. If a ±10 degree rotation angle is desired, the width of the mirror can only be a factor of 12 times the thickness of the spacer layer 48 or about 50 microns.

Figure 6:
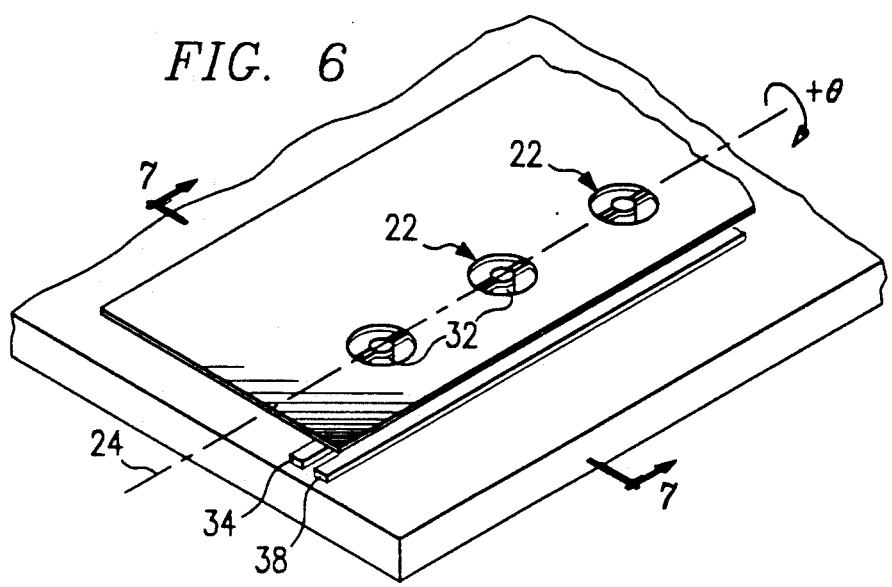
FIG. 6 depicts perspectively a second embodiment of the disclosed invention.
Figure 7:
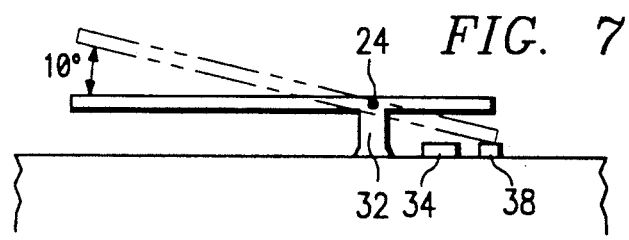
FIG. 7 illustrates, in cross-sectional view, the second embodiment of the disclosed invention depicted in FIG. 6 along line 7—7.

FIGS. 6 and 7 depict an asymmetric mirror structure that overcomes the limitation on rotation. It can be operated only in one direction, but provides for a relatively wide mirror and reasonable angles of operation within the above spacer constraints.

Figure 8:
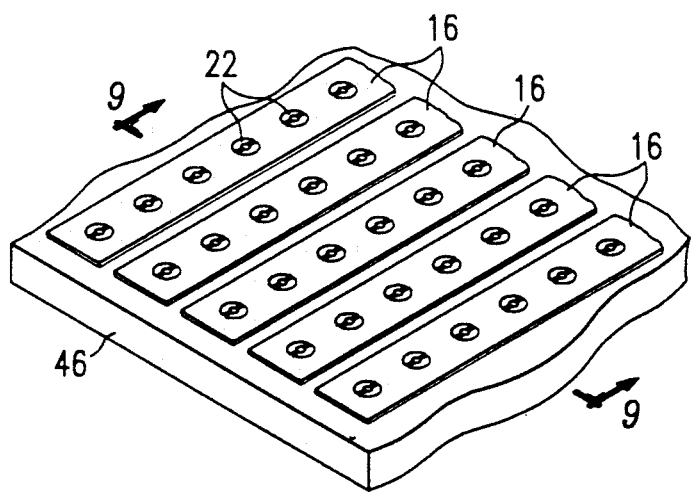
FIG. 8 depicts perspectively a third embodiment of the disclosed invention.
Figure 9:
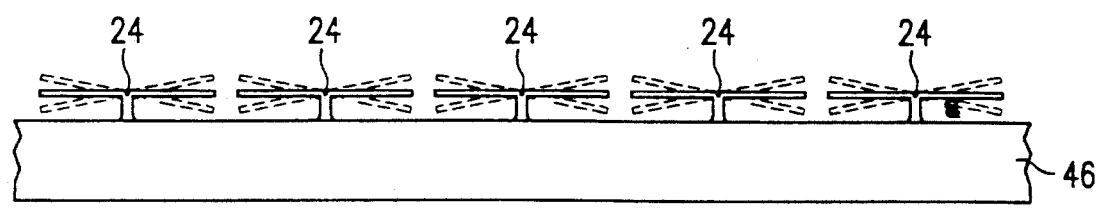
FIG. 9 illustrates, in cross-sectional view, the third embodiment of the disclosed invention depicted in FIG. 8 along line 9—9.

FIGS. 8 and 9 depict a practical way to achieve large area mirrors, that can operate through angles of 10 degrees or greater, and meet the manufacturing constraints of spacer layer 48 and support posts 32. In this approach, mirrors of large extent are segmented into a reticulated array of long slender elements 16. Each mirror element 16 is supported on a line of supporting elements 22 as shown in FIG. 3. Each mirror has the electrode 34 and stop 38 structure depicted in FIG. 3 necessary to address the mirror.

The optical effect of rotating the array of elements in synchronization about parallel axes 24 is equivalent to rotating a larger mirror through the same angle. An advantage of the reticulated mirror rotational scheme is that the extreme ends of the mirror array remain in approximately the same plane as the center elements. Unlike the conventional macroscopic galvanometer mirror, which introduces changes in the optical path length as a result of its rotation about an axis perpendicular to the optical path, the DMD mirror array accomplishes beam steering without changing the optical path length by more than a few microns. While galvanometers result in focus changes and other optical artifacts, the reticulated mirror method eliminates them. Fresnell lenses are constructed on the same principle.

As a result of the ability to individually tilt the long elements of the mirror array under precise electrical control, the array can be used to accomplish the same effect as a reflective Fresnell lens of a cylindrical type (e.g. having optical power along one axis only, and no optical power along the orthogonal axis). Signal generators 37 and 39 (shown in FIG. 3) may apply a prescribed series of voltage steps to the address electrodes of the parallel rows of mirrors corresponding to an equation describing the desired one dimensional optical surface. For instance, a plane mirror may be modeled by applying generally equivalent voltage levels to each electrode. Other optical surfaces may be modeled by tilting the mirrors a varying amount. This would provide an active, electronically programmable reflective, cylindrical optical element.

It is also possible under control of signal generators 37 and 39 to combine both the effect of the lens and the steering mirror. Light impinging on the surface could then be focused and redirected at the same time. This is possible due to the very high response speed of the DMD monolithic semiconductor type mirror elements.

Although the present invention has been described in detail, it should be understood that various changes, substitutions and alterations can be made hereto without departing from the spirit and scope of the invention as defined by the appended claims.

What is claimed is:

1. A resonant mirror comprising:
   a substrate having a top surface;
   a deflectable mirror element generally planar with the top surface and defining first and second ends; and
   at least two supporting elements for suspending the mirror element adjacent the top surface, the supporting elements defining an axis of rotation, at least one supporting element being a supporting member which is displaced from both said first and second ends of the mirror element.

2. The resonant mirror of claim 1 further comprising at least one electrode displaced outwardly in a first direction from the axis of rotation for periodically causing the mirror element to rotate about the axis of rotation when the first electrode is electrically coupled to a first voltage source and the mirror element is electrically coupled to a second voltage source.

3. The resonant mirror of claim 2 further comprising a stop at the same electrical potential as the mirror element, the stop being displaced outwardly from the first electrode whereby said mirror element lands on the stop prior to landing on the first electrode.

4. The resonant mirror of claim 2 further comprising a second electrode displaced outwardly from the axis of rotation in a second direction, the second direction being generally opposite to the first direction, the second electrode for periodically causing the mirror element to rotate about the axis of rotation when the second electrode is coupled to a third voltage source.

5. The resonant mirror of claim 1 wherein said at least two supporting elements are three or more supporting elements.

6. The resonant mirror of claim 5 wherein said three or more supporting elements include two supporting elements, each being connected to said first and second ends.

7. The resonant mirror of claim 1 wherein every one of said at least two supporting elements is displaced from both said first and second ends of the mirror.

8. A method of manufacturing a resonant mirror on a substrate comprising the steps of:
   fabricating at least one support pad on a substrate;
   depositing a spacer layer over the pad;
   exposing the support pad;
   depositing a hinge layer on the spacer layer and the exposed pad;
   coating portions of the hinge layer with an etch stop;
   depositing a mirror layer on the coated hinge layer;
   selectively etching the mirror and hinge layers to create a mirror having at least two supporting elements, at least one of the supporting elements being displaced from an edge of the mirror; and
   removing the spacer layer.

9. The method of claim 8 wherein the step of depositing a spacer layer further comprises the step of depositing a layer of photomask.

10. The method of claim 9 wherein the steps of depositing a hinge layer and depositing a mirror layer further comprise the steps of:
    depositing a hinge layer of Ti:Si:Al; and
    depositing a mirror layer of Ti:Si:Al.

11. The method of claim 8 wherein the steps of depositing a hinge layer and depositing a mirror layer further comprise the steps of:
    depositing a hinge layer of Ti:Si:Al; and
    depositing a mirror layer of Ti:Si:Al.

12. A method of manufacturing a resonant mirror on a substrate comprising the steps of
    forming a rotatably mirror having first and second ends;
    forming at least tow supporting elements for supporting the mirror adjacent the substrate, the supporting elements forming an axis of rotation, at least one of the supporting elements being a supporting member which is displaced from both said first and second ends of the mirror.

13. The method of claim 12 further comprising the steps of:
    depositing a spacer material on the substrate; and
    removing the spacer layer after forming the rotatable mirror.

14. The method of claim 13 wherein the two forming steps further comprise the steps of:
    forming at least one support post of Ti:Si:Al; and
    forming the rotatable mirror of Ti:Si:Al.

15. The method of claim 12 wherein the two forming steps further comprise the steps of:
    forming at least one support post of Ti:Si:Al; and
    forming the rotatably mirror of Ti:Si:Al.

16. The method of claim 12 wherein said step of forming at least two supporting elements comprises the step of forming every one of said at least two supporting elements displaced from both said first and second ends of said mirror.

17. The method of claim 12 wherein said step of forming at least two supporting elements comprises forming three or more supporting elements.

18. The method of claim 17 wherein said step of forming three or more supporting elements comprises the step of forming two of said supporting elements, each being connected to said first and second ends.

19. A resonant mirror comprising:
    a substrate having a top surface;
    a deflectable mirror element generally planar with the top surface; and
    at least tow supporting members for suspending the mirror element adjacent the top surface, the supporting members defining an axis of rotation and being displaced from an edge of the mirror element.

20. The resonant mirror of claim 19 further comprising at least one electrode displaced outwardly in a first direction from the axis of rotation for periodically causing the mirror to rotate about the axis of rotation when the first electrode is electrically coupled to a first voltage source and the mirror is electrically coupled to a second voltage source.

* * * * *